United States Patent Office 3,137,696
Patented June 16, 1964

3,137,696
4-CHLORO, 5-MERCAPTO-3(2H)-PYRIDAZINONES
Franz Reicheneder and Karl Dury, Ludwigshafen (Rhine), Adolf Fischer, Mutterstadt, Pfalz, and Herbert Stummeyer, Mannheim, Germany, assignors to Badische Anilin- & Soda-Fabrik Aktiengesellschaft, Ludwigshafen (Rhine), Germany
No Drawing. Filed Jan. 28, 1963, Ser. No. 254,414
Claims priority, application Germany Feb. 2, 1962
6 Claims. (Cl. 260—250)

This invention relates to new pyridazones and herbicidal compositions containing these compounds. The invention also relates to processes for controlling weeds using the said compounds.

It is an object of the present invention to provide new pyridazones having valuable properties. Another object of the invention is to selectively control weeds growing between crop plants.

These and other objects and advantages of the present invention are achieved by pyridazone derivatives of the general formula:

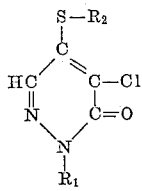

in which $R_1$ denotes a member selected from the group consisting of hydrogen, alkyl, substituted alkyl, cycloalkyl, substituted cycloalkyl, aryl and substituted aryl and $R_2$ denotes a member selected from the group consisting of alkyl, substituted alkyl, alkenyl, substituted alkenyl, cycloalkyl, substituted cycloalkyl, acyl, substituted acyl, aralkyl and substituted aralkyl.

Herbicidal agents comprising these compounds are very well suited to controlling weeds. A special advantage which they have as compared with known triazine derivatives having herbicidal activity is that they selectively destroy weeds between crop plants. In addition, the agents according to this invention may be used in a suitable dosage for the total destruction of all plants and for the prevention of undesired plant growth.

As compared with the triazine derivatives, the present compounds have a shortened decay period which substantially eliminates the risk of subsequent damage to crop plants sown or planted later. Similarly, the more rapid initiation of action of the agents according to this invention is advantageous as compared with the triazine derivatives.

The agents according to this invention for influencing, especially for inhibiting plant growth are also suitable for influencing plant growth in other ways, especially for defoliation, for accelerating ripening by premature desiccation, for example of potato crops, and also for decreasing fruit setting, retarding blooming, and prolonging the harvesting period and storability. In suitable concentrations, the agents according to this invention may in some cases promote germination and rooting.

It is known to use chloroaminopyridazones, for example 1-phenyl-4-amino-5-chloropyridazone-(6), as agents for controlling undesirable plant growth. As compared with these agents, the agents according to this invention are characterised by increased selectivity with respect to crop plants.

The pyridazone derivatives to be used according to this invention may be prepared in the usual way, for example by reacting a 4,5-dichloropyridazone-(6) substituted in 1-position. For example 1-phenyl-4-ethylthio-5-chloropyridazone-(6) is obtained by reacting 1-phenyl-4,5-dichloropyridazone-(6) (obtainable according to U.S. Patent No. 2,628,181) with sodium ethylmercaptide.

The following are given as examples of active substances for agents for influencing plant growth according to this invention:

| | Melting point, ° C. |
|---|---|
| 4-carboxymethylthio-5-chloropyridazone-(6) | 234 to 235 |
| 4-ethylthio-5-chloropyridazone-(6) | 231 to 232 |
| 4-phenylthio-5-chloropyridazone-(6) | 210 to 211 |
| 1-phenyl-4-methylthio-5-chloropyridazone-(6) | 116 to 117 |
| 1-phenyl-4-phenylthio-5-chloropyridazone-(6) | 117 to 118 |
| 1-phenyl-4-carboxymethylthio-5-chloropyridazone-(6) | 157 to 158 |

The agents for influencing plant growth according to this invention may be used in the usual way, alone or in admixture in the form of solutions, emulsions, suspensions or dusts. The form in which they are used depends on the particular application. The form of application must however ensure a fine distribution of the active substance during application, especially when using the agent as a total herbicide. In premature desiccation and also in defoliation, the effect may be still further increased by the coemployment of phytotoxic carrier substances such as high boiling point mineral oil fractions or chlorohydrocarbons.

On the other hand, the selectivity of growth inhibition is more pronounced when using the agents with carrier substances inert to plants, for example in selective weed control in carrot crops.

For the preparation of sprayable solutions, mineral oil fractions of medium to high boiling point may be used for example, such as kerosene or diesel oil, and also coal tar oils and oils of vegetable or animal origin, furthermore cyclic hydrocarbons, such as tetrahydronaphthalene and alkylated naphthalenes, which are added to the active substances according to this invention, with or without the use of suitable auxiliary solvents, as for example xylene. Solutions in low boiling point solvents, such as alcohols, ketones, ethers or low boiling point hydrocarbons or chlorinated hydrocarbons are les suitable for direct use than for combination with suitable emulsifiers in the production of concentrates for the preparation of aqueous emulsions. The aqueous forms are preferably emulsions and dispersions. The substances, as such or in one of the above-specified solvents, are homogenized in water, preferably by means of wetting or dispersing agents.

Examples of cation-active emulsifying or dispersing agents are quaternary ammonium compounds, and examples of anion-active dispersing agents are soaps, soft soaps, aliphatic long-chain sulfuric acid monoesters, aliphatic or aromatic sulfonic acids, long-chain alkoxyacetic acids, and examples of non-ionic dispersing agents are polyethylene ethers of fatty alcohols and polyethylene oxide condensation products. On the other hand, concentrates may be prepared from active susbtance, emulsifier or dispersing agent and solvent, if any, which can be diluted with water before use.

Dust compositions may be prepared by mixing or grinding of the active substances together with a solid carrier. Examples of carriers are: calcium carbonate, talc, diatomaceous earth, calcium phosphate, boric acid, flour, cork flour, fertilizers, carbon and other materials. On the other hand, the substances may also be applied to the carrier substances by means of a volatile solvent. In this way, it is possible to prepare granulates that can be scattered.

The form in which the agents are used can be adapted to the methods of application by adding substances which improve distribution, adherence, stability to rain, and penetration power, such as fatty acids, resins, wetting agents, emulsifying agents, glue or alginates.

The spectrum of biological action may be widened by adding substances having bactericidal, fungicidal or plant growth influencing properties and also by combination with fertilizers.

The invention is illustrated by, but not limited to, the following examples. The examples show the action of the agents according to this invention.

*Example 1*

Soil is treated with 1-phenyl-4-methylthio-5-chloropyridazone-(6) at the rate of 5 and 10 kg./hectare. The active substance is sprayed onto the soil as a 40% aqueous dispersion (with reference to the active substance) which has been prepared by means of sodium ligninsulfonate as dispersing agent. Seedlings develop from seeds of *Sinapis alba* (mustard), *Chenopodium album* (goosefoot), *Poa annua* (annual meadow grass) and *Galium aparine* (cleavers) which have been sown in soil thus pretreated up to the cotyledon stage but after four weeks are almost completely withered.

*Example 2*

1-phenyl-4 - methylthio - 5 - chloropyridazone-(6) is sprayed at the rate of 10 to 20 kg./hectare suspended in 500 liters of water per hectare onto an agricultural area following a harvest of early potatoes. The following weeds are destroyed by this treatment within three to five weeks: *Galinsoga parviflora* (gallant soldier), *Raphanus raphanistrum* (wild radish), *Sinapis arvensis* (charlock), *Matricaria chamomilla* (camomile), *Stellaria media* (chickweed), *Chenopodium album* (goosefoot) and *Poa annua* (annual meadow grass). After these plants have withered, the field may be freshly planted with cultivated plants, for example, lettuce, without risk of damage. The following pyridazone derivatives have an activity similar to that of 1-phenyl-4-methylthio-5-chloropyridazone-(6):

| | Melting point, ° C. |
|---|---|
| 4-carboxymethylthio-5-chloropyridazone-(6) | 234 to 235 |
| 4-ethylthio-5-chloropyridazone-(6) | 231 to 232 |
| 4-phenylthio-5-chloropyridazone-(6) | 210 to 211 |
| 1-phenyl-4-phenylthio-5-chloropyridazone-(6) | 117 to 118 |
| 1-phenyl-4-carboxymethylthio-5-chloropyridazone-(6) | 157 to 158 |

*Example 3*

*Beta vulgaris* (sugar beet) and *Triticum sativum* (wheat) are sown in an agricultural field. After emergence of the plants (height of growth 4 to 8 cm.), the following active substances are sprayed on the field as aqueous dispersions at the rate of 2.5 to 5 kg./hectare:

(I) 1-phenyl-4-methylthio-5-chloropyridazone-(6)
(II) 1-phenyl-4-methoxy-5-chloropyridazone-(6).

Five weeks after the treatment, the cultivated plants on the field treated with active substance I are still growing very well. On the field treated with active substance II, the wheat plants to the extent of 50% are damaged by corrosive action. The beet are practically completely destroyed. The effect of both agents on the following weeds which have sprung up between the cultivated plants is about the same: *Sinapis alba* (mustard), *Chenopodium album* (goosefoot), *Galinsoga parviflora* (gallant soldier), *Urtica urens* (small nettle) and *Poa annua* (annual meadow grass). These weeds are destroyed almost completely by both agents.

We claim:
1. A compound having the formula:

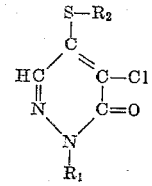

in which $R_1$ denotes a member selected from the group consisting of hydrogen and phenyl and $R_2$ denotes a member selected from the group consisting of lower alkyl, phenyl, and carboxymethyl.

2. 4-carboxymethylthio-5-chloropyridazone-(6).
3. 4-ethylthio-5-chloropyridazone-(6).
4. 4-phenylthio-5-chloropyridazone-(6).
5. 1-phenyl-4-methylthio-5-chloropyridazone-(6).
6. 1 - phenyl - 4 - carboxymethylthio - 5 - chloropyridazone-(6).

References Cited in the file of this patent
UNITED STATES PATENTS

| 2,524,802 | Hultquist et al. | Oct. 10, 1950 |
| 2,786,840 | Druey et al. | Mar. 26, 1957 |
| 2,798,869 | Druey et al. | July 9, 1957 |
| 3,020,143 | Bluestone | Feb. 6, 1962 |
| 3,044,865 | Rosen | July 17, 1962 |